United States Patent Office 2,765,214
Patented Oct. 2, 1956

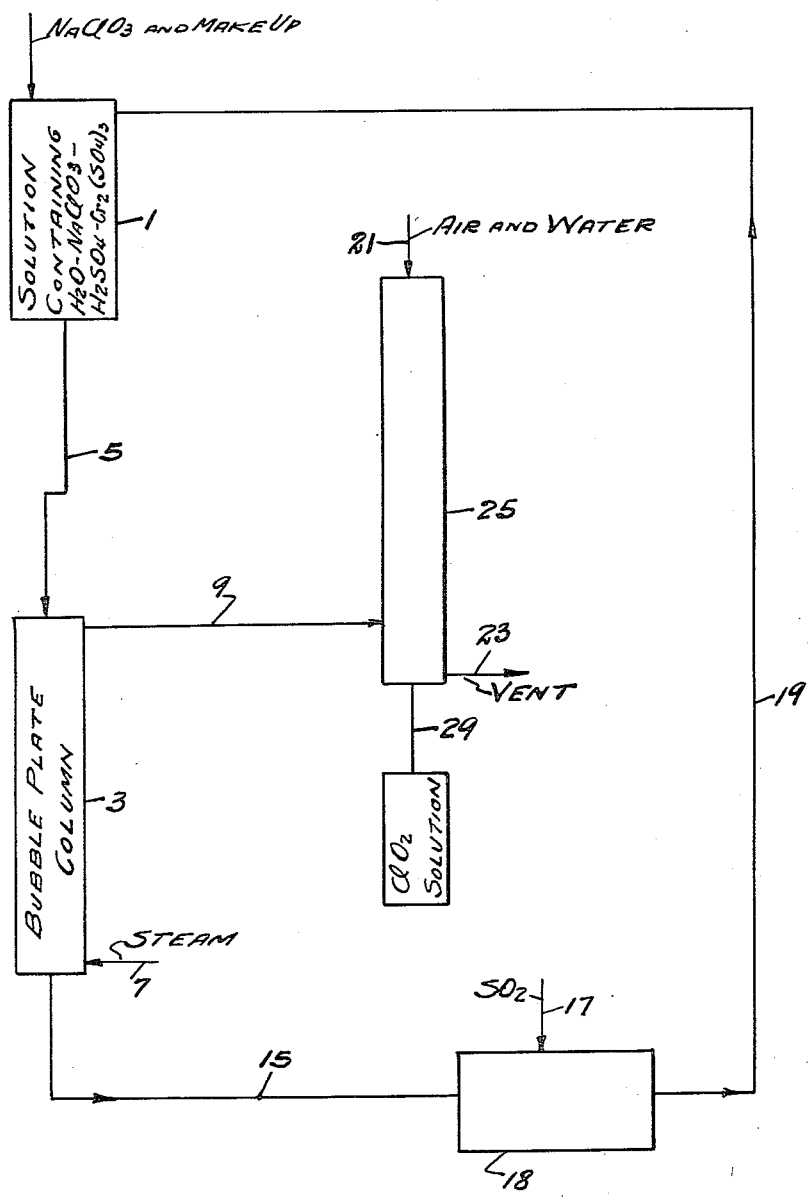

2,765,214

METHOD OF MAKING CHLORINE DIOXIDE

Alphonse Pechukas, Akron, Ohio, assignor, by mesne assignments, to Columbia-Southern Chemical Corporation, Pittsburgh, Pa., a corporation of Delaware Application October 12, 1950, Serial No. 189,824

8 Claims. (Cl. 23—152)

This invention relates to a novel method of preparing chlorine dioxide. It is known that chlorine dioxide may be prepared by reaction of an aqueous solution containing trivalent chromium and alkali metal chlorate. In this case, the trivalent chromium serves to reduce the metal chlorate, thus evolving chlorine dioxide, and is itself oxidized to hexavalent chromium. A process of this character is described in U. S. Patent 2,376,935, granted May 29, 1945, to S. H. Persson.

In the normal practice of such process, a solution containing trivalent chromium is held at a temperature below 40° C. and sodium chlorate is added thereto, the amount of chlorate added being substantially in excess of 3 moles of chlorate per mole of trivalent chromium. Typical chlorate compounds which are used are the alkali metal chlorates, such as potassium or sodium chlorates. After this solution has been prepared, the solution is heated to an elevated temperature above 40° C., generally 80 to 100° C. and is contacted with an inert gas in order to strip evolved chlorine dioxide from the solution. Thereafter, the solution is cooled to a lower temperature, for example 10 to 30° C., upon which crystallization of sodium sulphate decahydrate occurs. These crystals are separated and the remaining solution is treated with a suitable reducing agent, such as sulphur dioxide, at a temperature below 40° C., in order to reduce hexavalent chromium in the solution to trivalent state, whereupon the solution is recycled.

One difficulty which arises in performance of this process is due to the fact that a large volume of solution must be heated and cooled. This is a slow and laborious process. Moreover, localized overheating in one portion of the solution tends to establish explosive concentrations of chlorine dioxide, thus creating a serious hazard.

In accordance with this invention, these difficulties may be avoided by heating the reaction solution with a hot inert gas which will sweep evolved chlorine dioxide from the mixture and thereby form a dilute mixture of chlorine dioxide and the gaseous diluent. Steam is a particularly advantageous gaseous diluent for this purpose. However, other condensable or non-condensable inert gaseous diluents, such as air, nitrogen, carbon dioxide, and the like may be used.

This process may be very effectively conducted by passing steam or other hot gas into contact with the solution, preferably in countercurrent contact in a packed column, bubble-plate column, or like gas-liquid contact column. In such process, the steam simultaneously heats the solution to reaction temperature and strips evolved chlorine dioxide therefrom substantially as rapidly as formed, and produces diluated chlorine dioxide. This is advantageous since it avoids establishment of explosive concentrations of chlorine dioxide, the hot gas automatically diluting chlorine dioxide as evolved.

The accompanying drawing conveniently illustrates a typical embodiment of the contemplated invention. As illustrated in this drawing, a suitable reacting solution may be prepared in a suitable vessel 1. This reacting solution may be prepared simply by mixing an alkali metal chlorate, such as sodium chlorate, with chromic sulphate in aqueous medium. In order to achieve rapid reaction, it is found advantageous to establish an acid content of at least 2 moles of sulphuric acid or equivalent acid in the solution. The optimum acid concentration ranges between 2 and 4 moles of acid per liter. However, higher acid concentrations are permissible in certain instances. It will also be understood that phosphoric acid or chromic acid or other like acid may be used which is not oxidized by chlorine and chlorine dioxide, although sulphuric acid is preferred. Preparation of this solution is normally conducted at a temperature below about 40° C. and if necessary, suitable cooling equipment can be provided in order to maintain this temperature.

While the process is operative using large excesses of chlorate, it is found most advantageous from the standpoint of yield and speed of reaction to use an excess of chromic compound. That is, in the subsequent reaction of chromic ion with chlorate ion, one mole of chromic ion will react with 3 moles of chlorate ion to yield chlorine dioxide. Thus, the amount of chromic ion present in the solution preferably should be in excess of 1 mole to 3 moles of chlorate ion. The magnitude of this excess is capable of some variation. However, best results appear to be obtained when a $Cr^{+3}$ excess of about 20 to 120 percent of theoretical is used; about 50 to 100 percent excess being optimum.

When the reaction mixture is thus prepared, very little actual reaction is observed at a temperature below 40° C. In effect, the solution may be regarded as a solution of chromic chlorate.

The reacting solution is piped into the top of a suitable packed column or like gas-liquid contact column 3 through line 5. Steam or other hot inert gas is introduced into the bottom of the column through line 7 and passes upwardly in countercurrent contact with the falling reacting solution, heating the solution to the reacting temperature and simultaneously stripping chlorine dioxide from the solution essentially as rapidly as produced. The mixture of steam and chlorine dioxide emanates from the packed column through line 9. Sufficient steam or other diluent is used to heat the reaction solution and to produce a chlorine dioxide diluent mixture which contains at least 5, and preferably 9 or more volumes of diluent per volume of chlorine dioxide.

The solution which emanates from the bottom of the packed column flows through line 15 into a suitable receptacle 18 in which the solution is regenerated by reduction, for further use. Such solution comprises water, sulphuric acid, and hexavalent chromium. If an excess of chlorate has been used, the solution will contain chlorate. However, if the process is conducted in the preferred manner, the solution passing through line 15 will contain no significant concentration of chlorate.

The solution is regenerated by contact with sulphur dioxide or equivalent reducing agent in order to reduce the hexavalent chromium, or at least a portion thereof, to trivalent chromium. Thus, sulphur dioxide is introduced into the solution through line 17. This reduction may be conducted at any convenient temperature at which a rapid reduction will occur. Where chlorate is absent in the reaction, no particular care need be taken to maintain the temperature at a low level. Consequently, recourse to cooling, which is necessary where an excess of chlorate has been used, is eliminated. On the other hand, where chlorate is present, the regeneration must be effected at a temperature below that at which chlorine dioxide is evolved, for example below 40° C.

Following reduction of the solution to chromic state, the solution is returned through line 19 to mixer 1 where sodium chlorate is added and the other reactants are made up to their initial concentration.

The gaseous mixture of steam and chlorine dioxide emanating through line 9 is delivered to a scrubber 25 which is cooled by suitable means to condense the steam. The water thus condensed solves the chlorine dioxide and conveys it to the bottom of the scrubber through line 29 to a chlorine dioxide solution storage tank 31. To avoid establishment of a vacuum due to dissolution or condensation of diluent, and thus to avoid consequent local explosive concentrations of chlorine dioxide, air is introduced into the upper portion of the scrubber through line 21. Water also may be directed downwardly through the scrubber, being introduced through line 21 to condense the steam and dissolve chlorine dioxide. Excess air emanates through line 23 to a suitable vent.

One series of tests was conducted using an 11-section vacuum jacketed Brun bubble-plate column into which the feed solution was fed for production of chlorine dioxide. A feed solution reservoir was connected to the column at the top and the outlet of the column at the top was vented to a condenser scrubber. This scrubber consisted of a 35 x 180 millimeter water-cooled vertical column packed with ¼ inch Berle saddles, and had a water-cooled cold finger mounted above the condenser column.

Substantially saturated steam was introduced into the bottom of the column and feed solution into the top thereof at the rates stated in the table below. The steam-chlorine dioxide mixture was condensed in the scrubber by passing countercurrently to a downwardly flowing stream of water. This water was introduced into the upper portion of the condenser and allowed to trickle downwardly over the packing, and the resulting chlorine dioxide solution was collected from the bottom of the condenser. The following table tabulates the conditions of several runs, and the results obtained:

| Run | Components of Feed Solution | | | | Solution Feed rate, milliliters per minute | Steam rate, liters per minute | $ClO_2$ in solution from condenser, grams per liter |
|---|---|---|---|---|---|---|---|
| | $Cr^{+3}$, moles per liter | $H_2SO_4$, moles per liter | $NaClO_3$, moles per liter | Percent of $Cr^{+3}$ Excess | | | |
| A | 1.4 | 2.0 | 2.1 | 100 | 2.0 | 3.6 | 19.4 |
| B | 0.98 | 4.0 | 2.1 | 40 | 1.3 | 8.2 | 16.9 |
| C | 1.05 | 4.0 | 2.1 | 50 | 2.5 | 9.4 | (*) |
| D | 1.40 | 4.0 | 2.1 | 100 | 1.0 | 3.7 | (**) |

*Rate of evolution of chlorine dioxide, 0.22 mole per hour.
**Rate of evolution of chlorine dioxide, 0.08 mole per hour.

Although the present invention has been described as to specific details of certain embodiments thereof, it is not intended that such details shall be regarded as limitations upon the scope of the invention except insofar as included in the accompanying claims.

What is claimed:

1. The process of preparing chlorine dioxide which comprises contacting an acid solution containing trivalent chromium and chlorate dissolved therein, with a hot inert gas in amount sufficient to heat the solution with consequent evolution of chlorine dioxide and to strip the evolved chlorine dioxide from the solution and to produce a chlorine dioxide-inert gas mixture containing sufficient inert gas to render the mixture non-explosive.

2. The process of preparing chlorine dioxide which comprises forming an aqueous acid solution containing trivalent chromium and chlorate dissolved therein; introducing said solution into the upper portion of a gas-liquid contact column; introducing a hot inert gaseous diluent into the bottom of a column at a rate sufficient to heat the solution to a temperature above 60° C. with consequent evolution of chlorine dioxide and to strip evolved chlorine dioxide from the solution and to produce a mixture of chlorine dioxide and diluent containing sufficient diluent to render the mixture non-explosive; and removing the resultant mixture of the diluent and the chlorine dioxide from the column.

3. The process of claim 2 wherein the amount of diluent is sufficient to produce a mixture of chlorine dioxide and diluent containing at least 9 volumes of diluent per volume of chlorine dioxide.

4. The process of claim 2 wherein the amount of diluent used is sufficient to ensure production of a gaseous mixture containing at least 5 volumes of diluent per volume of chlorine dioxide.

5. The process of claim 2 wherein the diluent is steam.

6. A method of recovering chlorine dioxide from a solution in which chlorine dioxide has been generated which comprises stripping the chlorine dioxide therefrom with sufficient steam to produce a gaseous mixture containing in excess of about 5 volumes of steam per volume of chlorine dioxide, and condensing the mixture while supplying sufficient air to the mixture at the zone of condensation to prevent establishment of a vacuum and thus to prevent escape of chlorine dioxide from the condensing mixture.

7. A process of preparing chlorine dioxide which comprises contacting an aqueous acid solution containing a water soluble trivalent chromium compound and a metallic chlorate therein with an amount of steam sufficient to heat the solution to the temperature at which chlorine dioxide is evolved, and to strip the evolved chlorine dioxide away from the solution and produce a gaseous mixture containing at least 5 volumes of steam per volume of chlorine dioxide; the relative temperature of the steam and the solution being such that heat is supplied by the steam to the solution.

8. A method of preparing chlorine dioxide which comprises heating an aqueous acid solution containing a water soluble trivalent chromium compound and a metallic chlorate with an amount of a hot diluent gas sufficient to heat the solution to the temperature at which chlorine dioxide is evolved, and to strip the evolved chlorine dioxide from the solution and produce a gaseous mixture containing at least 5 volumes of diluent gas per volume of chlorine dioxide; the relative temperature of the gas and the solution being such that heat is supplied by the gas to the solution.

References Cited in the file of this patent

UNITED STATES PATENTS

| | | |
|---|---|---|
| 2,078,045 | Vincent | Apr. 20, 1937 |
| 2,131,447 | Logan | Sept. 27, 1938 |
| 2,172,434 | Cunningham | Sept. 12, 1939 |
| 2,309,457 | Hutchinson | Jan. 26, 1943 |
| 2,338,268 | Stossel et al. | Jan. 4, 1944 |
| 2,344,346 | Evans | Mar. 14, 1944 |
| 2,376,935 | Persson | May 29, 1945 |
| 2,451,826 | Haller | Oct. 19, 1948 |
| 2,481,241 | Rapson | Sept. 6, 1949 |
| 2,530,468 | Hutchinson | Nov. 21, 1950 |

FOREIGN PATENTS

| | | |
|---|---|---|
| 581,931 | Great Britain | Oct. 30, 1946 |